Patented Jan. 5, 1932

1,840,036

UNITED STATES PATENT OFFICE

EDWARD T. HOWELL, OF SOUTH MILWAUKEE, WISCONSIN, ASSIGNOR, BY MESNE ASSIGNMENTS, TO E. I. DU PONT DE NEMOURS & COMPANY, A CORPORATION OF DELAWARE

AMINO ANTHRONES AND PROCESS OF PREPARING THE SAME

No Drawing.   Application filed July 2, 1928.   Serial No. 290,034.

This invention relates to amino anthrones and more particularly to 2-amino 9-anthrone and to the 2-substituted amino 9-anthrones and to a process of preparing the same.

It is an object of this invention to provide a method whereby 2-amino 9-anthrone and the substituted amino anthrones are made technically available, since these bodies are of importance themselves and more particularly so when used as intermediates for the preparation of other products.

Other and further important objects of this invention will become apparent from the following description and appended claims.

It has hitherto been proposed to prepare this type of body by the reduction of beta amino anthraquinone to the anthrone. This method of preparation, however, although it is said to give amino anthrone, undoubtedly produces a mixture of isomers in which the "=O" is in both the 9 and 10 positions with respect to the amino group. According to the present invention, the amino anthrone or the substituted amino anthrone is produced by a method which definitely fixes the (=O) in the 9 position only.

The present process comprises the condensation of p' amino benzyl ortho benzoic acid or an N-substitution product thereof, these bodies being the subject of copending application Serial No. 290,033, filed of even date herewith, by means of a condensing agent like sulfuric acid, with attendant closing of the ring to form a definite and single amino anthrone body.

The reaction may probably best be expressed by the following chemical equation, in which R represents a hydrogen, acidyl group or (RR) a benzylidene group and the like:

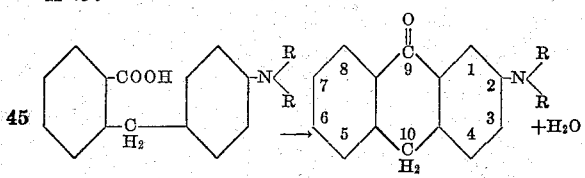

I do not include in this invention 2 dimethyl amino 9-anthrone. The substituents on the nitrogen included and claimed in this invention are such that they may be readily hydrolyzed from the anthrone bodies, as by boiling in weak acid. Among these substituents are the acetyl, phthalyl, benzoyl, urea, benzylidene, toluene sulfonyl, benzene sulfonyl groups and the like. In other words the substituted groups of my invention are members typified by the following series:

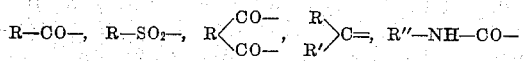

and the like, wherein R is an organic radical, R' is any organic radical or hydrogen and R" another benzyl-ortho-benzoic acid residue before condensation or an anthrone residue after condensation, and which series is characterized by the common property that the substituent in the amino group is readily hydrolyzable By the term "residue of a mono valent acidylating agent" as used in the claims I mean to include such members of the above referred to series which contain only one free bond, such as, for example, R—CO—, R—SO$_2$ and R"—NH—CO—.

By the term "residue of a divalent acidylating agent" as used in the claims, I intend to include those members of the above referred to series which contain two free bonds such as for example,

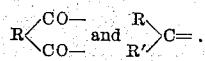

Without limiting my invention to any particular procedure the following example, in which parts by weight are given, will serve to illustrate a preferred method of preparation.

*Example.*—One part of p' amino benzyl ortho benzoic acid is added to 15 parts of sulfuric acid 66° Bé. This mixture is then heated to 75 to 80° C. for a short time, cooled and poured into 150 parts of water. The amino anthrone thus formed is soluble in the acid solution. To isolate the anthrone, the acid solution is neutralized with aqueous ammonia, whereby 2-amino 9-anthrone separates and is filtered off. After drying, the product is obtained in the form of a yellowish powder. It is soluble in dilute acids as the salt of the amine and also soluble in dilute caustic alkalies, passing over to the enol form. 2-amino-9-anthrone may be oxidized by known methods, applicable to similar compounds, such as with ferric chloride, to beta amino anthraquinone.

While in the example given, the condensation of p' amino benzyl ortho benzoic acid to 2-amino-9-anthrone is described as carried out at 75 to 80° C. using 66° Bé. sulfuric acid, lower temperatures and more concentrated sulfuric acid may be employed. For instance, the condensation can be effected at 50° C. using monohydrate.

The p' substituted amino benzyl ortho benzoic acids may be condensed in a similar manner and may be oxidized to the beta amino anthraquinone body. During the step of condensation and oxidation, the substituent on the nitrogen can be hydrolyzed off to form beta amino anthraquinone.

In the specification and claims, the term "substituted amino" refers to substituents on the nitrogen which may be readily hydrolyzed off after the condensation to the anthrone or anthraquinone has taken place.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing a 2-amino-9-anthrone substantially free from isomers having the following probable general formula:

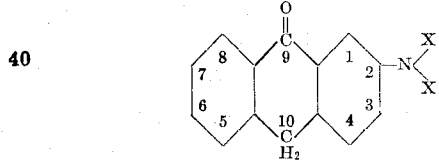

in which the two X's stand for two hydrogen atoms, or in which one X stands for one hydrogen atom and the other X stands for a residue of a monovalent acidylating agent, or in which both X's stand for the residue of a divalent acidylating agent, which comprises reacting the corresponding p'-amino-benzyl-ortho-benzoic acid with a condensing agent to effect closing of the ring.

2. The process of preparing a 2-amino-anthrone substantially free from isomers having the following probable general formula:

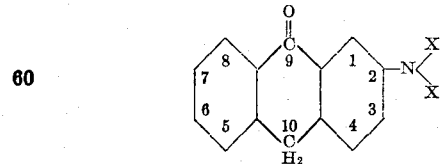

in which the two X's stand for two hydrogen atoms, or in which one X stands for one hydrogen atom and the other X stands for a residue of a monovalent acidylating agent, or in which both X's stand for the residue of a divalent acidylating agent which comprises reacting the corresponding p'-amino-benzyl-ortho-benzoic acid in concentrated sulfuric acid to effect closing of the ring.

3. The process of preparing 2-amino-9-anthrone in a form substantially free from isomers, which comprises treating p'-amino benzyl ortho benzoic acid with a condensing agent to effect closing of the ring.

4. The process of preparing 2-amino-9-anthrone in a form substantially free from isomers, which comprises treating p'-amino benzyl ortho benzoic acid in concentrated sulfuric acid to effect closing of the ring.

5. As new articles of manufacture, 2-amino-9-anthrones in a form substantially free from isomers having the following probable general formula:

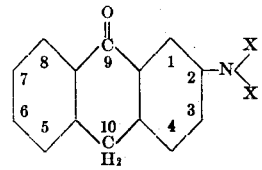

in which the two X's stand for two hydrogen atoms, or in which one X stands for one hydrogen atom and the other X stands for a residue of a monovalent acidylating agent, or in which both X's stand for the residue of a divalent acidylating agent.

6. As a new article of manufacture, 2-amino 9-anthrone in a form substantially free from isomers.

7. The process of preparing 2-amino-9-anthrone in a form substantially free from isomers, which consists in heating p'-amino-benzyl-ortho-benzoic acid with concentrated sulfuric acid, cooling the solution, diluting with water, neutralizing the resulting diluted acid solution with aqueous ammonia and filtering off the 2-amino-9-anthrone.

In testimony whereof I have hereunto subscribed my name at Carrollville, Milwaukee County, Wis.

EDWARD T. HOWELL.